Aug. 8, 1950  J. GRIER, JR  2,518,306
CORN PLANTER
Filed Jan. 24, 1945  2 Sheets-Sheet 1
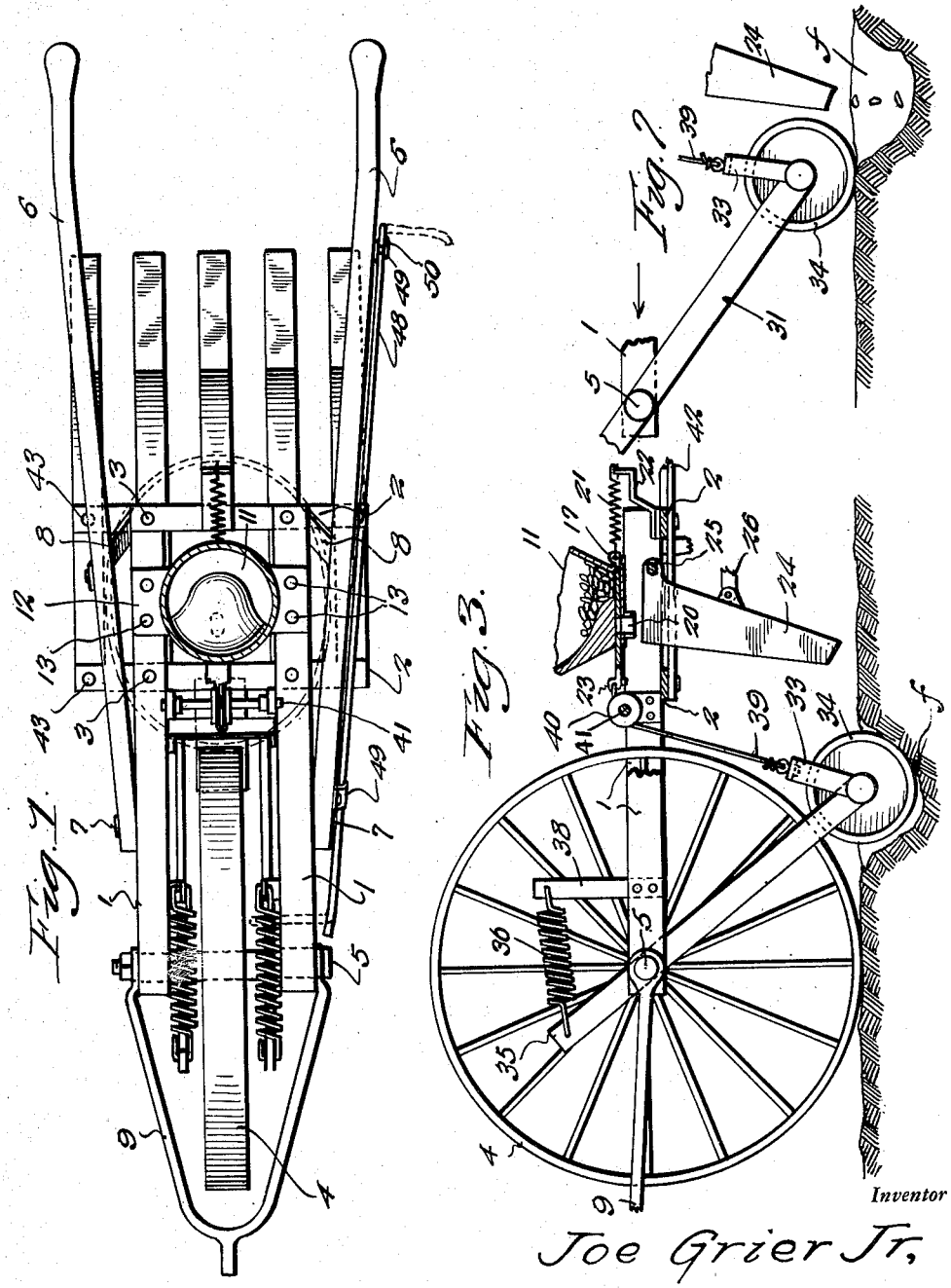
Inventor
Joe Grier Jr,
By *Clarence A. O'Brien and Harvey B. Jacobson*
Attorneys

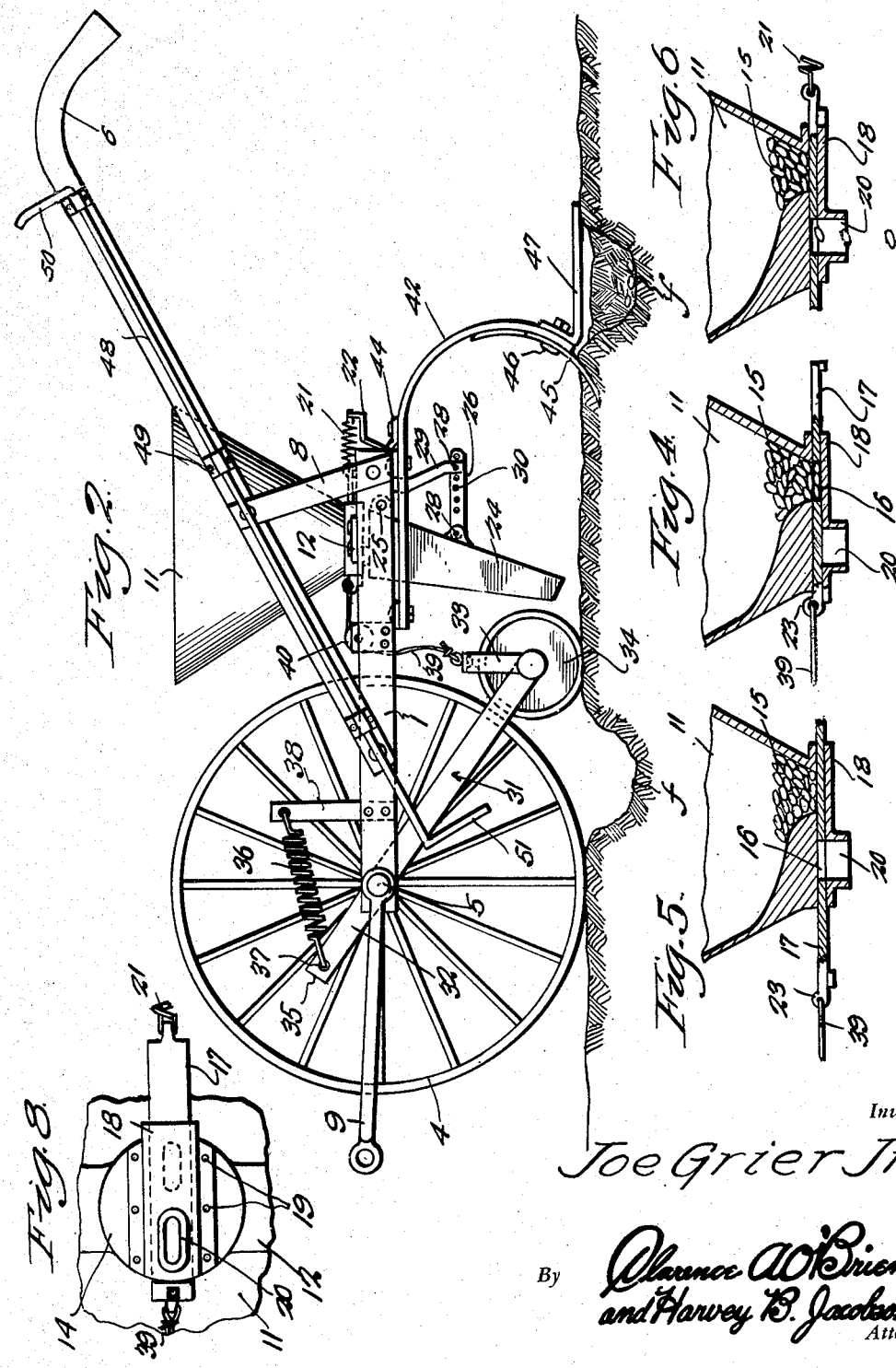

Patented Aug. 8, 1950

2,518,306

UNITED STATES PATENT OFFICE 2,518,306

CORN PLANTER

Joe Grier, Jr., Lula, Miss.

Application January 24, 1945, Serial No. 574,299

1 Claim. (Cl. 111—34)

My invention relates to improvements in corn planters of the check row planting type, the primary object in view being to provide a planter adapted to be drawn along the rows across the furrows in a field prepared for check row planting and equipped to automatically drop seed corn at the intersections of the rows and furrows in properly timed relation to travel of seed-dropping mechanism to such intersections, all without using a check row wire, or like control device, and which is adapted to cover up the dropped seed corn to the proper depth without scattering the same, may be easily handled by one man, and is comparatively simple in construction, economical to service, and inexpensive to manufacture.

Other and subordinate objects are also comprehended by my invention, all of which, together with the precise nature of my improvements, and the advantages thereof, will be readily understood when the succeeding description and claim are read with reference to the drawings accompanying and forming part of this specification.

In said drawings:

Figure 1 is a view in plan, with the hopper shown in horizontal section, of my improved corn planter in a preferred embodiment thereof.

Figure 2 is a view in side elevation illustrating the manner in which the covering shovels operate, Figure 3 is a fragmentary view partly in side elevation and partly in vertical section, illustrating the position of the parts when the yoke-operating ground wheel rolls into a furrow.

Figure 4 is a fragmentary view in vertical longitudinal section illustrating the hopper, the seed discharge slide and the guide for the slide, with the slide in normal position, and the parts drawn to an enlarged scale, Figure 5 is a similar view illustrating the seed discharge slide in seed-discharging position, Figure 6 is another similar view illustrating the manner in which the seed is discharged through the discharge neck of the hopper, Figure 7 is a fragmentary view in side elevation illustrating the position of the slide-operating yoke and the yoke-operating ground wheel when the seed drops into a furrow, and Figure 8 is a fragmentary view in bottom plan of the hopper, the seed-discharge slide and the guide therefor together with the hopper-supporting brackets.

Referring to the drawings by numerals, my imprived corn planter as shown comprises a pair of frame-forming side beams 1 spaced apart in parallel, side-by-side relation and connected together by a pair of rear cross bars 2 underlying the beams 1 in spaced-apart relation and secured to said beams, as by bolts 3. The cross bars 2 extend beyond the side beams 1 for a purpose presently seen. A ground wheel 4 is rotatably mounted between the front ends of the side beams 1 by means of a spindle bolt 5. The usual pair of cultivator handle bars 6 incline upwardly and rearwardly from the side beams 1 with the front ends thereof bolted to said side beams, as at 7. Brace bars 8 extend between the handle bars 6 and the rear ends of the side beams 1 for supporting said handle bars 6. A draft yoke 9 is swingably mounted at its ends on the bolt 5 in straddling relation to the side beams 1 and ground wheel 4 and to extend forwardly of said wheel for the attachment of a draft animal thereto.

A seed supply hopper 11 is mounted on the side beams 1 intermediate the pair of cross bars 2 coplanar with the ground wheel 4 and by means of a hopper-supporting, plate-like bracket 12 extending across said side beams 1 and bolted thereon, as at 13. The bracket 12 is preferably formed as a part of the hopper 11 and is provided with a rounded, disc-like center portion 14, as best shown in Figure 8, forming the bottom of the hopper 11. At the bottom thereof, the seed hopper 11 is provided with a rear, restricted, seed-discharge throat 15 preferably of oval form and arranged in the line of draft. The seed-discharge throat 15 is adapted to register with a similarly shaped opening 16 in an elongated seed-discharge slide 17 endwise slidable forwardly and rearwardly in the bottom of the hopper 11 in a plate-like guide 18 bolted, as at 19, to the portion 14 and formed forwardly of the throat 15 with a depending seed-discharge neck 20 depending therefrom and of the same size internally as the opening 16. A coil spring 21 suitably secured to the rear end of said slide 17 and to a bracket 22 on one of the cross bars 2 yieldingly retains said slide in a retracted normal position with the opening 16 registering with the throat 15. An apertured, upstanding ear 23 on the front end of the seed-discharge slide 17 engages the front of the hopper 11 and establishes the retracted normal position of the slide. A seed-dropping boot 24 is provided beneath the discharge neck 20 to direct seed discharged out of said neck to the planting location. The seed-dropping boot is pivoted at its upper end and rear side on a cross rod 25 extending between the side beams 1, the arrangement being such that said boot may be swingably adjusted forwardly and rearwardly, as occasion may require. A link 26 pivoted to the rear side of the boot 24, as at 27, and adapted to be bolted, as at 28, to a depending arm 29 on one of the cross bars 2 provides for retaining said boot in adjusted position, said link being provided with longitudinally spaced bolt holes 30 therein for selection in accordance with the desired adjustment of said boot. As will be noted, the seed-dropping boot is located behind the ground wheel 4 a distance such that said ground wheel will travel well past a furrow before said boot travels into a position directly over the furrow. In this connection, it is also to be noted that the ground wheel 4 is sufficiently large in diameter to roll across a furrow without sinking therein to a depth such that the furrow will stall forward travel of said wheel.

A slide-operating yoke 31 inclines downwardly and rearwardly from the bolt 5 and comprises a pair of side arms 32 vertically swingable on said bolt 5 upon opposite sides of the ground wheel 4 with the rear ends thereof connected together by an upwardly arched cross member 33. A yoke-operating ground wheel 34 of small diameter is rotatably mounted between the rear ends of the side arms 32 directly in the rear of the ground wheel 4 and intermediate said ground wheel and the seed-dropping boot 24, which is to say forwardly of said boot. The yoke-operating ground wheel 34 is of the approximate size to drop into a furrow, as shown in Figure 3. As will be noted, the side arms 32 of the yoke 31 are mounted on the bolt 5 to provide relatively short lever arms 35 forwardly of said bolt. A pair of coil springs 36 attached at ends thereof, as at 37, to said lever arms 35 and to uprights 38 on the side beams 1 yieldingly urge the rear ends of the side arms 32 downwardly and the ground-engaging wheel 34 against the ground.

An operating connection is provided between the slide-operating yoke 31 and the seed-discharge slide 17 comprising a pull cord, or wire, 39 having its ends suitably attached, to the top of the cross member 33 and to the apertured ear 23, and which extends over an idler pulley 40 rotatably mounted on a cross rod 41 extending between the side beams 1 in front of said discharge slide, the arrangement being such that when the yoke-operating ground wheel 34 drops into a furrow, the seed-discharge slide 17 is pulled forwardly to register the opening 16 therein with the discharge neck 20.

A battery of shovel-carrying bars 42, similar to the usual spring harrow teeth, extend rearwardly of the seed-dropping boot 24 in side-by-side, parallel and equi-distantly spaced relation with the outermost bars 42 bolted, as at 43, to the ends of the cross bars 2, adjacent bars 42 being similarly secured to the cross bars 2 by the bolts 3, and a central bar 42 being secured by a bracket 44 to one of said cross bars 2. The shovel-carrying bars 42 are equipped with small cultivator-like covering shovels 45 aligned transversely of the gang and bolted to said bars 42, as at 46. Bar-like, ground-engaging shoes 47 are attached to the rear ends of the shovel-carrying bars 42 by the bolts 46 to ride over the ground in trailing relation to the shovels 45 and establish the depth to which the shovels 45 enter the ground. As best shown in Figure 2, the shoes 47 prevent the shovels 45 from entering the ground to the depth of the furrows so that said shovels will not contact seed deposited in the bottom of the furrows.

A disabling rod 48 is rotatably mounted in bearings 49 on one handle bar 6 to extend alongside said bar for setting rotatably to prevent the slide-operating yoke 31 from swinging downwardly and the yoke-operating ground wheel 34 from entering a furrow. The disabling rod 48 is provided at one end with a crank-like handle 50 and at its other end with a crank arm 51 designed to be swung into underlying relation to one of the side bars 32 of the yoke 31 in the rear of the bolt 5 and thus disable said yoke.

Referring now to the operation of the described invention, the ground in a field having been first prepared with furrows f extending in one direction and to indicate the location of cross rows extending in the other direction, the planter is drawn along the rows under the guidance of an operator maintaining the planter on the row by means of the handle bars 6. At the intersection of each cross row, not shown, and furrow f, the yoke-operating ground wheel 34 drops into the furrow f, as shown in Figure 3, permitting the slide-operating yoke 31 to be swung by the springs 36 in the proper direction to cause a pull on the cord, or wire, 39 of sufficient duration to pull the seed-discharge slide 17 forwardly from the retracted normal position until the opening 16 in said slide registers with the discharge neck 20. In the normal retracted position of said slide 17, said slide is loaded with seed from the hopper 11 by such seed gravitating into the aperture 16 so that when the aperture is moved into registration with the discharge neck 20, the load of seed will fall through said neck 20 and boot 24. A particular feature of my invention is that the parts are so arranged as to deposit the seed dropping through the boot 24 into the furrow f after the yoke-operating ground wheel 34 travels forwardly out of the furrow f, that is, with the planter being pulled by a draft animal at the normal walking speed of the animal. As soon as the yoke-operating ground wheel 34 travels up out of the furrow, as shown in Figure 7, the seed is deposited from the boot 24 in the furrow f and sufficient slack is created in the cord 39 to permit the spring 21 to retract the seed discharge slide to normal position for reloading in the manner previously described. After the seed has been discharged into the furrow f, the shovels 45 cover the seed in a manner which will be clear. The seed-discharge throat 15 in the hopper 11 and the aperture 16 in the seed-discharge slide 17 are preferably arranged and proportioned so that three seeds are loaded into the aperture 16 at each operation and planted in each furrow f.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a corn planter adapted to travel crosswise of furrows, a frame having side handle bars, a spindle on said frame, a front ground wheel on said spindle adapted to roll over furrows, a gravity feed seed hopper on the frame in the rear of the ground wheel, a horizontal seed discharge slide at the bottom of the hopper intermittently operable to discharge seed therefrom, a yoke pivoted on said spindle in straddling relation to the ground wheel for vertical swinging movement, a second ground wheel on said yoke in the rear of the first ground wheel adapted to descend into the furrows and thereby permit said yoke to swing downwardly, spring means connected to said yoke and frame to urge said yoke and second ground wheel downwardly, a pulley on said frame, a flexible connection between said yoke and slide trained over said pulley for operating said slide by downward swinging of said yoke, and means on one handle bar operable to lift the yoke in opposition to said spring means and thereby lift the second ground wheel clear of the ground to disable said second ground wheel.

JOE GRIER, JR.

REFERENCES CITED

The following references are of record in the file of this patent:

UNITED STATES PATENTS

| Number | Name | Date |
|---|---|---|
| 274,027 | Pratt | Mar. 13, 1883 |
| 359,518 | Pratt | Mar. 15, 1887 |
| 438,123 | Todd | Oct. 7, 1890 |
| 556,551 | McKee | Mar. 17, 1896 |
| 654,548 | Latisniere | July 24, 1900 |
| 720,211 | Adams | Feb. 10, 1903 |
| 1,063,127 | Joyce | May 27, 1913 |
| 1,170,237 | Freisinn | Feb. 1, 1916 |
| 1,252,658 | Butler | Jan. 8, 1918 |
| 1,260,174 | Fisher | Mar. 19, 1918 |
| 1,291,995 | Melland | Jan. 21, 1919 |
| 1,480,184 | Reust | Jan. 8, 1924 |
| 1,618,329 | Fuquay | Feb. 22, 1927 |
| 1,806,389 | Dickerson | May 19, 1931 |

FOREIGN PATENTS

| Number | Country | Date |
|---|---|---|
| 398,184 | France | Mar. 16, 1909 |